United States Patent
Peak et al.

(10) Patent No.: US 7,539,635 B1
(45) Date of Patent: May 26, 2009

(54) SYSTEM AND METHOD FOR GENERATING A PERSONALIZED TAX ADVICE DOCUMENT

(75) Inventors: Bradley K. Peak, Parkville, MO (US); Jennifer L. Buckner, Charlotte, NC (US)

(73) Assignee: H&R Block Tax Services, LLC., Kansas City, MO (US)

( * ) Notice: Subject to any disclaimer, the term of this patent is extended or adjusted under 35 U.S.C. 154(b) by 1000 days.

(21) Appl. No.: 10/747,537

(22) Filed: Dec. 29, 2003

(51) Int. Cl.
*G06F 17/22* (2006.01)

(52) U.S. Cl. .......................................... 705/31
(58) Field of Classification Search .................... 705/31
See application file for complete search history.

(56) References Cited

U.S. PATENT DOCUMENTS

| | | | | |
|---|---|---|---|---|
| 5,920,848 | A * | 7/1999 | Schutzer et al. | 705/42 |
| 6,473,745 | B2 * | 10/2002 | Doerr et al. | 706/11 |
| 6,697,787 | B1 * | 2/2004 | Miller | 705/31 |
| 7,149,713 | B2 * | 12/2006 | Bove et al. | 705/36 R |
| 7,249,080 | B1 * | 7/2007 | Hoffman et al. | 705/35 |
| 2002/0019791 | A1 * | 2/2002 | Goss et al. | 705/36 |
| 2003/0144936 | A1 * | 7/2003 | Sloan et al. | 705/36 |
| 2005/0027632 | A1 * | 2/2005 | Zeitoun et al. | 705/36 |

OTHER PUBLICATIONS by Intuit Press Release—Intuit's Lacerte Announces New Professional Tax Products (Intuit-Lacerte).*

* cited by examiner

*Primary Examiner*—Alexander Kalinowski
*Assistant Examiner*—Bruce I Ebersman
(74) *Attorney, Agent, or Firm*—Standley Law Group LLP

(57) ABSTRACT

The present invention is a system and method for generating personalized tax advice documents. An advice protocol is integrated in tax preparation software to provide relevant financial advice statements based on a taxpayer's income tax return data. A set of financial recommendations or statements is developed from which applicable statements may be selected for the tax advice documents. Categories and priorities are associated with each financial statement as well as specific financial triggers and calculations. The triggers are evaluated based on tax return data. If the conditions of a trigger are met, a calculation is performed to determine the actual benefit to the taxpayer. The specific financial recommendation or statement associated with the trigger is then added to a tax advice document. The taxpayer is then provided with a printed copy of the tax advice document comprising the specific statements selected for the taxpayer.

15 Claims, 2 Drawing Sheets

SYSTEM AND METHOD FOR GENERATING A PERSONALIZED TAX ADVICE DOCUMENT

FIELD OF THE INVENTION

The present invention relates generally to systems and methods for providing financial advice to individuals. In particular, the present invention relates to a system and method for generating a personalized tax advice document based on a taxpayer's tax return data.

BACKGROUND OF THE INVENTION

For several years, tax preparation software used by income tax preparation services such as H&R Block® has had a taxpayer advice feature. Upon completion of a taxpayer's tax return, the taxpayer is provided with recommendations and financial advice related to the tax return. For example, the taxpayer may be provided with a recommendation related to saving money on a home mortgage. In current methods for providing financial advice to taxpayers, however, recommendations and financial advice statements are prioritized in one way for all users, and in some instances, may not be applicable to the taxpayer's current situation. Because the tax information is used to trigger the recommendations, events occurring after the tax year are not always included in the analysis and qualifications for the specific recommendations and advice. In some instances, recommendations or statements that are likely to result in financial benefits to the taxpayer are not emphasized over recommendations or statements that are less likely to result in financial benefits. In other instances, recommendations or statements that would benefit the taxpayer are not provided at all. Therefore, there is a need for tax preparation software that generates a personalized tax advice document based on a taxpayer's tax return data.

SUMMARY OF THE INVENTION

The present invention is a cascading advice protocol that is integrated in a tax preparation program to provide a specific range of relevant financial advice statements based on data in a taxpayer's income tax return. It accounts for urgency, specificity of content, and applicability tailoring a broad range of tax advice statements into a single document. First, a set of financial recommendations or statements is developed from which applicable recommendations or statements may be selected. Categories and priorities are associated with each financial recommendation or statement as well as specific financial triggers. They are then integrated into the tax preparation software.

The triggers in the tax preparation software are evaluated based on data provided for completion of the taxpayer's income tax return. If the conditions of a trigger are met, a calculation is performed to determine the actual tax or savings benefit to the taxpayer. The specific financial recommendation or statement associated with the trigger is then added to a tax advice document for the taxpayer. Upon completion of the taxpayer's return, a tax preparer reviews the recommendations and statements with the taxpayer. The taxpayer is then provided with a printed copy of the tax advice document comprising the specific recommendations and statements selected for the taxpayer.

Recommendations and statements that may be provided to the taxpayer relate to client requested (e.g., specifically requested by a client based on how interview questions are answered) tax alerts (e.g., changes in tax law or changes in a taxpayer's situation that will impact tax or financial situation), tax planning (e.g., charitable deductions, flexible spending accounts), self-employed or small business issues, governmental assistance, savings and interest, retirement (e.g., 401(k), 403(b), 457, SEP, SIMPLE, Keogh plans, IRA contributions), home ownership (e.g., home interest deduction), estate planning, and education (e.g., student loan interest, Hope Scholarship Credit/Lifetime Learning Credit) and safety net (e.g., statements with broader universal appeal). The tax advice document that is generated is unique to the taxpayer. A total of 100 individual recommendations or statements selected according to the triggers and conditions of the present invention may result in the generation of over 1.5 million different documents. The generation of a personalized tax advice document for a taxpayer is unique to the present invention.

DESCRIPTION OF EXAMPLE EMBODIMENTS

Figure 1:
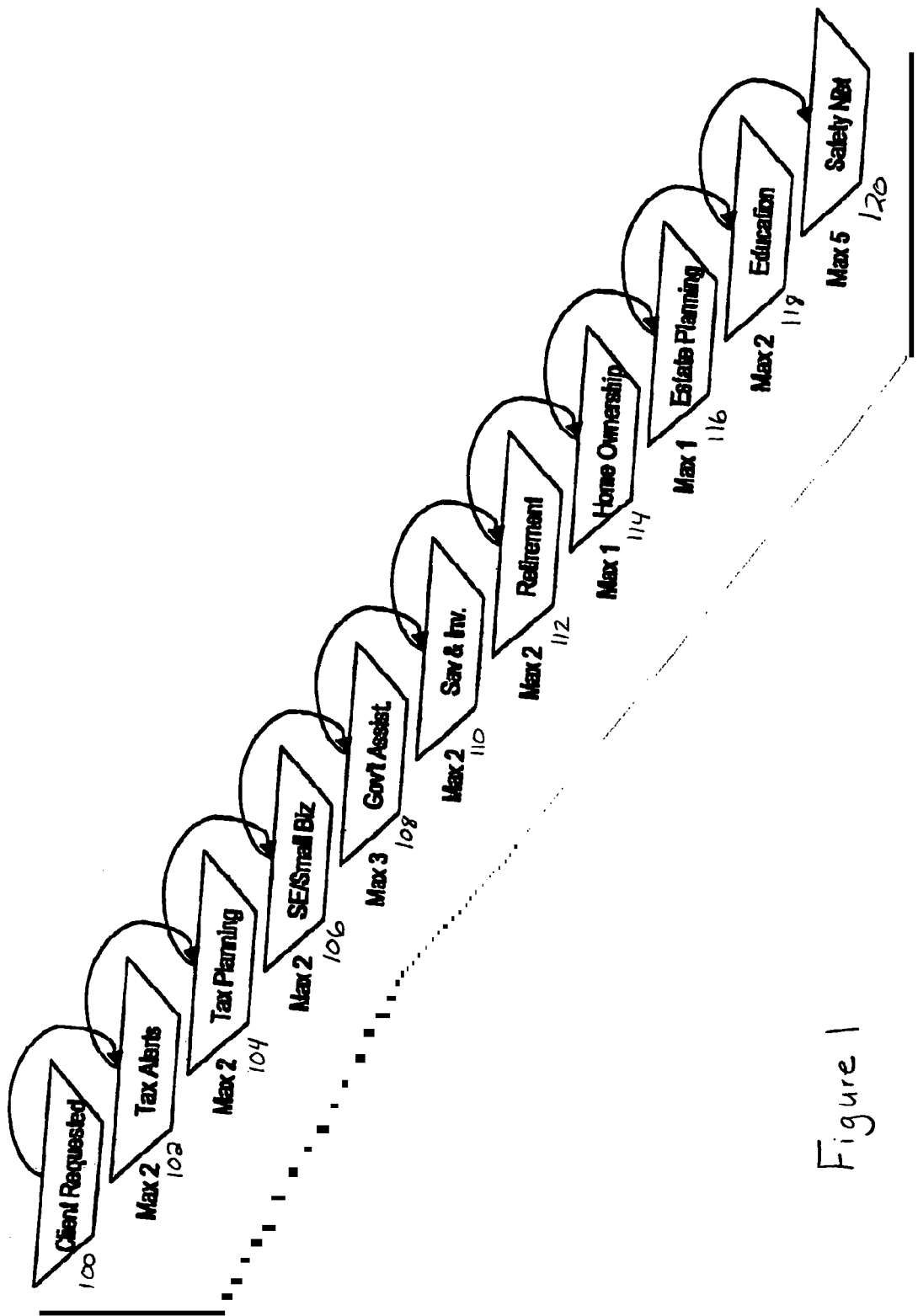
FIG. 1 is block diagram of an advice protocol according to an example embodiment of the present invention.

Referring to FIG. 1, a block diagram of an advice protocol according to an example embodiment of the present invention is shown. The cascading advice protocol of FIG. 1 is a tax preparation software feature for prioritizing and distributing specific groupings of financial advice recommendations and statements in a tax advice document, triggered by tax return information and captured by the tax preparation software during the tax return preparation process. All possible recommendations and statements are first categorized, based on content, into a category or topic (e.g., client requested 100, tax alerts 102, tax planning 104, self-employed/small business 106, government assistance 108, saving and investments 110, retirement 112, home ownership 114, estate planning 116, education 118, and safety net 120). Associated with each category is a maximum number of recommendations or statements, which can be adjusted, to be selected from the category for the tax advice document. For example, for the tax alerts category 102, a maximum of two statements in this category will be selected for the tax advice document.

Each category is then prioritized based on specificity, expected relevance, and urgency of content. Within each category, each recommendation or statement is also prioritized by specificity and expected relevancy. These predefined categories and priorities are then programmed, with the recommendations and statements, into the tax preparation software.

When a tax return is prepared using the tax preparation software, all recommendations and advice statements triggered by the tax return information are then subjected to the cascading advice protocol prioritization by the software. The protocol uses the pre-defined categories and priorities to order each recommendation or statement to be provided in the tax advice document.

The first recommendations or statements provided in the document may be "client requested" 100. The client receiving the tax advice document may request that specific recommendations or statements appear in the beginning of the document. For example, the client may ask that the document include recommendations or statements related to government assistance programs.

The software then looks into the next tax-related category 102 for the highest priority triggered (relevant) recommendation or statement. This recommendation or statement is identified as the next statement to display on the computer screen and print in the tax advice document. The program then repeats this process for each remaining category 104, 106, 108, 110, 112, 114, 116, 118, 120 until the category is exhausted or the maximum number of statements allowed for the category is reached. If no recommendations or statements in a particular category are triggered for a particular tax return, it progresses to the next category and continues the process.

The process continues until a predefined maximum number of recommendations or statements for the tax advice document, if required, is reached. If no recommendations or statements were triggered in the first 10 categories, (100, 102, 104, 106, 108, 110, 112, 114, 116, 118), a minimum of five statements are triggered from the last category 120 (the safety net category).

Table 1 provides another list of the categories, category names, and number of statements from each category that may be used in generating a tax advice document.

TABLE 1

| Category # | Category Name | Maximum Number From Each Category |
|---|---|---|
| 1 | Client Requested | 2 |
| 2 | Tax Alerts | 2 |
| 3 | Tax Planning | 2 |
| 4 | Self-employed & Small Business | 3 |
| 5 | Government & Non-profit | 3 |
| 6 | Savings & Investments | 2 |
| 7 | Retirement | 2 |
| 8 | Home Ownership | 1 |
| 9 | Estate Planning | 1 |
| 10 | Education | 2 |
| 11 | Safety Net | 5 |
| 12 | BA Savings Statements | 8 |
| 13 | Deceased | 5 |

Table 2 is a list of example tax advice statements and associated triggers, priorities, categories, and category names. When the conditions of a trigger are met, the statement is added to the tax advice document in the associated category according to the associated priority. The tax advice document may be reorganized according to categories and priorities as statements are added. Alternatively, statements may be selected first and then organized according to category and priority to generate the final tax advice document.

TABLE 2

| Statement | Trigger | Pri. | Cat. | Cat. Name |
|---|---|---|---|---|
| Nutrition Assistance through the Food Stamp Program: The Food Stamp Program helps you buy food. You can spend food stamps like cash at most stores that sell food. In most states, you get a food stamp card that's like a credit card, which you can use to buy food at the grocery store. To find out if you're eligible, call 1-800-221-5689. | Government screener question should be triggered if client meets this statement, but output of this statement occurs if government screener question gets a Yes. And 130% or less than US Poverty Income Guidelines including unearned income. | 5 | 1 | Client Requested |
| Nutrition Assistance for Women, Infants, and Children (WIC): You (and Name of child or children) may be eligible for free food along with tips on nutrition under the government's WIC program. WIC is for women who are pregnant or who just had babies and for children up to age 5. To find out if you qualify, call the (name of state) WIC Agency at (state phone #). There's no cost to you. | Government screener question should be triggered if client meets this statement, but output of this statement should only occur if government screener question gets a Yes. and 185% of U.S. Poverty Income guidelines and dependents born after 1998, or expecting to add a dependent through birth (state numbers for WIC below) | 6 | 1 | Client Requested |
| National School Lunch Program: (Child(ren)'s Name) may be eligible for free or discounted lunches through the National School Lunch Program. To find out if (child(ren)'s name is (are) eligible, please call (state number) for information on how to apply. | Government screener question should be triggered if client meets this statement, but output of this statement should only occur if government screener question gets a Yes. and 185% of U.S. Poverty Income guidelines and dependents born after 1985. (state number in table below). | 7 | 1 | Client Requested |
| Saver's Credit: We calculate that you can take advantage of the Saver's Credit in 2003. If you and your spouse each contribute $1,000 to a qualified plan, your joint savings in 2003 can be as much as $1,000. Your best savings strategy depends on your specific situation. Your tax professional can help you compare the benefits of the retirement savings options available to address your short-term and long-term savings goals. | 1. AGI equal to or less than $50000 married filing jointly, $37500 head of household or $25000 for single, married filing separately, and qualifying widower<br>2. Entered Saver's Credit calculation screen AND<br>3. Not a Dependent or full-time Student<br>4. No input in planning portion of Saver's Credit calculator (Remove)<br>5. Suppress if no earned income<br>Calculation: Use (1) contribution amount and (2) net savings amount from 2003 "best" column | 2 | 1 | Client Requested |

TABLE 2-continued

| Statement | Trigger | Pri. | Cat. | Cat. Name |
|---|---|---|---|---|
| Owning vs. Renting: Based upon your monthly rent payment and an assumed interest rate of 7%, it appears you could afford a $X 30-year mortgage. You would generally need between $A-$B for a down payment, which could be cash you have saved or have been given (gifts are subject to certain restrictions). Keep in mind you will also need to pay closing costs, property taxes (which are deductible) and insurance (which isn't). | 1. No 7216 restriction<br>2. A = (x/.97)-x B = (x/.95)-x<br>3. Suppress statement/change input screen to require $100 or more. | 8 | 1 | Client Requested |
| Insure Your Kid(s): Your kid(s) may be eligible for low-cost or free health care in your state-- even if you work full time. To find out more, call 1(877) KIDS NOW, (543-7669) toll free or visit www.insurekidsnow.gov on the Internet. Ask your tax professional for a brochure about this program. | 1. Government screener question displays if client qualifies. Print statement only if government answer is YES.<br>2. Suppress the message if no incidences of dependent children living with the TP/SP | 4 | 1 | Client Requested |
| Getting Money Quickly: A Refund Anticipation Loan (RAL) is certainly one of the fastest ways to get the amount of your anticipated refund. But as you know, the lending bank charges you for this service. And you must repay the loan in full even if the IRS doesn't approve your refund. Remember, you can get your refund in approximately 10-21 days and avoid the bank fee just by filing electronically and requesting direct deposit. That way, you can put more of your refund in your pocket. | Trigger: Anyone taking any type of refund anticipation loan, except Nac-RAL. Nac-RAL should not rec this statement. | 1 | 1 | Client Requested |
| Avoid Finance Charges: You decided to use an Easy Pay balance due loan. The good news is you have an extra 90 days to pay your taxes, and you will not have any finance charges if the loan is paid in full by July 15. But, you will incur finance charges from the date of the loan if it is not paid off on or before July 15. | Anyone taking a Balance Due | 3 | 1 | Client Requested |
| A New Dependent: You indicated you may be supporting a new dependent next year. Tax breaks help you offset the cost of supporting a dependent. Based on this year's return, an additional dependent would lower your 2003 taxes by $X. If necessary, we can help you adjust your withholding or estimated tax payments. | 1. Will you be supporting anyone else next year? Answered yes, reason is other than birth or adoption.<br>2. "X" > 0 TPS: X = $3,000 × marginal tax bracket<br>Check the math against a zero tax liability | 6 | 2 | Tax Alerts |
| Earned Income Credit: (Child's Name) will not qualify as your child for purposes of calculating your earned income credit next year unless (Name) is a full-time student or is disabled. You may want to adjust your withholding or estimated tax payments to avoid surprises next year. For Multiple children (Children's Names) will not qualify as your children for purposes of calculating your earned income credit next year unless (qualifying children's names) are full-time students or are disabled. You may want to adjust your withholding or estimated tax payments to avoid surprises next year. | Age trigger of born in 1984;<br>Display onscreen message at exit from EIC screen | 5 | 2 | Tax Alerts |
| Child Care Credit: (Child's (Children's) Name) will be too old to qualify for the childcare credit next year. If you participate in a flexible spending account at work, you'll no longer be allowed to use it to pay childcare for (Name(s)). You should adjust your withholding or estimated taxes accordingly. | Age trigger of born in 1989;<br>Display onscreen message at exit from 2441 | 8 | 2 | Tax Alerts |
| Child Tax Credit: (Child(ren)'s Name) will be too old for the child tax credit next year. If (child(ren)'s name) hadn't qualified this year, your refund (balance due) would have been $X. We can help you adjust your withholding or estimated payments for next year accordingly. | Display onscreen message at exit from child information screen | 7 | 2 | Tax Alerts |
| Dependents: (Child's Name) will not qualify as your dependent next year unless (Name) is a full-time student or has less than $3,000 in income during 2003. You may want to adjust your withholding or estimated tax payments to avoid surprises next year. | Age trigger of born in 1984;<br>Display onscreen message at exit from child info screen | 3 | 2 | Tax Alerts |

TABLE 2-continued

| Statement | Trigger | Pri. | Cat. | Cat. Name |
|---|---|---|---|---|
| For Multiple Children (Children's Name) will not qualify as your dependents next year unless (Names) are full-time students or have less than $3,000 in income during 2003. You may want to adjust your withholding or estimated tax payments to avoid surprises next year. | | | | |
| IRA Withdrawals: You are required to withdraw a minimum amount from a traditional IRA after you reach age 70½. Otherwise, the IRS will penalize you 50% of the amount you should have withdrawn. We can help you determine the amount you must withdraw, which can't be rolled over to another IRA or Roth IRA. | 1. Taxpayer or spouse's date of birth between Jul. 1, 1932 and Dec. 31, 1993 inclusive. No 1099-R with IRA/SEP box marked AND no wages on return. | 2 | 2 | Tax Alerts |
| Earned Income Credit: Because you'll be 66 by the end of the year, you won't qualify for the earned income credit next year. Based on this years return, your refund (balance due) next year will be $X. You should adjust your withholding or estimated tax payments accordingly. | Same as last year | 13 | 2 | Tax Alerts |
| Child Care Credit: Consider claiming the childcare credit rather than using the flexible spending plan at work. Your taxes would have been $Y lower on this year's return had you claimed the credit. | Same as last year "X" > 0 | 10 | 2 | Tax Alerts |
| Putting Too Much in Your IRA: The IRS penalized you $X for pulling too much into your IRA. You'll be penalized again next year unless you contact your IRA custodian and have your contribution re-designated as part of your 2003 IRA contribution. Note: You can only do this for up to $3,000 ($3,500) of excess contributions. | Enter 5329 screen with excess IRA contributions calculated. Output: excess contributions present on return. TPS: Use 3,500 for t/ps age 50+ | 4 | 2 | Tax Alerts |
| Child Care Credit: In 2003, total allowable expenses increase to $3,000 per child, or $6,000 for two or more children. Your credit amount may also be higher next year. Assuming the same income and child care expenses as you have on your 2002 return, you would be eligible for a $X child care credit next year. You may want to adjust your withholding or estimated tax payments. | Child care credit claimed; Child Credit % > 20; exit 2441. TPS X = credit based on number of children born after 1989 and 2003 credit percentages | 9 | 2 | Tax Alerts |
| Birth of a New Child: Be sure to get a social security number for your new child so you can take full advantage of the many tax breaks children provide, including deductions, credits and a $3,000 exemption. If you need to pay for childcare in order to work, you can reduce your taxes further. You may also want to consider tax-advantaged education savings programs. | Will you be supporting anyone else next year? answered yes, birth indicated as reason. | 11 | 2 | Tax Alerts |
| Adoption of a New Child: Be sure that your adopted child has a social security number before you file next year's return, so you take full advantage of the many tax breaks children provide, including deductions, credits and a $3,000 exemption. If you need to pay for childcare in order to work, you can reduce your taxes further. You may also want to consider tax-advantaged education savings programs. | Will you be supporting anyone else next year? answered yes, adoption indicated as reason. | 12 | 2 | Tax Alerts |
| Avoid Penalties by Changing Your Withholding: Because you didn't have enough taxes withheld from your paychecks, the IRS penalized you this year. Consider increasing your withholding to avoid another penalty next year. Fill out a Form W-4 to give to your employer. | Balance due with a penalty and at least one W-2 | 14 | 2 | Tax Alerts |
| Retirement Plan Withdrawals: You must begin withdrawing money from your employer's retirement plan by April 1 of the year after you reach age 70½, or the year you retire, whichever comes later. If you miss these deadlines, the IRS will penalize you 50% of the amount you should have withdrawn. | Taxpayer or spouse born in or before 1932 and wages for the affected spouse on return. | 1 | 2 | Tax Alerts |
| Charitable Contributions: Donating to your house of worship, school, or other charitable organization can reduce your tax liability while helping your favorite charities. For each $100 of | 1. Any entry on Schedule A 2. No Charitable contributions TPS: X = $100 × 2002 marginal tax rate (based on 2002 TI) Bold dollar amount X | 15 | 3 | Tax Planning |

TABLE 2-continued

| Statement | Trigger | Pri. | Cat. | Cat. Name |
|---|---|---|---|---|
| contributions you make--including payroll deductions for the United Way or other agencies--your federal taxes will be reduced by $X. It's easy to overlook ways you help your favorite charities, so be sure to keep careful records, including car mileage and other out-of-pocket spending on behalf of a charity. | | | | |
| Flex Medical Spending: Your W-2 indicates you aren't taking advantage of a flexible medical spending account. If your employer offers one, consider signing up during the next enrollment period. Some of your pay will be set aside without deducting taxes so that you can use it to pay for allowable medical expenses. Keep in mind that you must use the set-aside money by the end of the year or lose it. | Same as last year | 6 | 3 | Tax Planning |
| Approaching Higher Tax Rate: You are within $1,000 of the next tax bracket. If your income increases by more than $X next year, some of your income will be taxed at a higher rate. You may want to increase your withholding or estimated payments to offset those higher taxes. (remove, we can help) | TPS: X = Top $ for filing status/bracket - taxable income. Y = next marginal tax rate higher; income wi/in $1,000 of next marginal break | 2 | 3 | Tax Planning |
| IRA Rollover: When you leave an employer, it's important to preserve the retirement savings you accumulated while employed there. Check with your former employer to find out whether you'll have to take a mandatory withdrawal by a certain date. If so, you'll need to roll over those funds into a new retirement plan to avoid paying taxes and penalties to the IRS. | Exit W-2 Hash Totals; W-2 box 12 coded D, E, F, G, H. | 9 | 3 | Tax Planning |
| Charitable Contributions: Donating to your house of worship, school, or other charity can reduce your tax liability while helping your favorite charities. For each $100 of contributions you make--including payroll deductions for the United Way or other agencies--your federal taxes will be reduced by <B>$%P</B>. It's easy to overlook ways you help your favorite charities, so be sure to keep careful records, including car mileage and other out-of-pocket spending on behalf of a charity. | 1. Schedule A on return not limited by AGI 2. Any charitable contribudon 3. "X" > 0 TPS: X $100 * 2003 marginal tax rate (based on 2002 TI). Bold dollar amount X. | 14 | 3 | Tax Planning |
| Gambling Losses: Your tax return states that your gambling wins were greater than your gambling losses. You can offset any gambling winnings dollar for dollar with any losses. So be sure to keep records of both. | Enter the gambling losses field. Output: Gambling losses less than gambling winnings. | 4 | 3 | Tax Planning |
| Allocated Tips: Your W-2 shows allocated tips, which we had to include as income. To avoid this next year, keep records showing you report all of your tips to your employer, so that you don't have to pay tax on tips you did not actually receive. | Enter W-2 box 8. Output: entry in field. | 10 | 3 | Tax Planning |
| Installment Agreement: We have included an IRS installment agreement request with your tax return. The IRS will charge you a $43 set-up fee. Once you hear from the IRS, you must make your full payment on the X each month. If you do not make all payments on time and in full on your payment date, the IRS can void the agreement and demand immediate payment of the balance. | Enter the 9465 screen. | 11 | 3 | Tax Planning |
| Teacher's Deduction: On your 2003 tax return, you'll be entitled to deduct up to $250 that you spend on items for your classroom, even if you don't itemize. So be sure to keep track of these expenses. | Teacher, educator, counselor, principal, principle, in TP or Spouse occupation field. Onscreen message for TP: Enter spouse name field; SP: enter zip code field | 1 | 3 | Tax Planning |
| Voluntary Withholding: If you don't want to make estimated tax payments, you can have money withheld from your social security payments to cover your federal taxes -- even if your social security isn't taxable. File Form W-4V to request this withholding. | Onscreen: 0 in box 4 Output: Social security, no withholding, estimates present OR balance due | 16 | 3 | Tax Planning |
| Avoid Capital Gains: You told us you're planning to sell your house. Have you considered waiting until you've lived there for | Yes to less than 2 years; filing status other than married filing jointly | 7 | 3 | Tax Planning |

TABLE 2-continued

| Statement | Trigger | Pri. | Cat. | Cat. Name |
|---|---|---|---|---|
| two years? That way, any profit up to $250,000 will be tax-free. Any additional profit will usually be taxed as a capital gain. | | | | |
| Avoid Capital Gains: You told us you're planning to sell your house. Have you considered waiting until you've lived there for two years? That way, any profit up to $500,000 will be tax-free. Any additional profit will usually be taxed as a capital gain. | Yes to less than 2 years, filing status married filing jointly | 8 | 3 | Tax Planning |
| Moving Expenses: You indicated that you were planning on relocating more than 50 miles for work. Therefore, many of your relocation expenses can be tax deductible. Ask your tax professional which expenses qualify. | Yes to relocating more than 50 miles | 5 | 3 | Tax Planning |
| Flexible Spending Accounts: This year you claimed a childcare credit, and based on your W-2 it appears you aren't participating in a flexible spending plan. Flexible spending plans let you save on your taxes by paying for child or dependent care with untaxed dollars. Check to see if your employer offers a flexible spending plan. You may want to sign up. | Child care credit claimed, dependent born after 1989; no entry in W-2 box 10. & 20% child care credit | 3 | 3 | Tax Planning |
| Consider Paying State and Local Taxes Early: If you make estimated payments on your state and/or local taxes, think about mailing your fourth quarter payment by Dec. 31, 2003. That way, you'll get the full deduction this year. However, you can't make a much larger-than-needed payment just to increase the deduction on your federal return. | Schedule A and estimated payments present | 12 | 3 | Tax Planning |
| Withholding on Unemployment Benefits: You can withhold part of your unemployment benefits to avoid any surprises at tax time next year. File Form W-4V with your state unemployment agency. | Entry in box 1, 1099-G, no entry in box 4 | 13 | 3 | Tax Planning |
| The Value of Old Shoes: If you donate old clothes or other household items to a favorite charity, be sure to get a receipt. It will be very valuable at tax time. A men's leather belt in good condition could be worth as much as $15 as a tax contribution. A pair of shoes in fair condition has a value of $5-15. A woman's two-piece business suit in good shape could be worth $65! Visit a thrift shop to determine the value of your contributions. | Anyone who itemized | 17 | 3 | Tax Planning |
| Give Property Instead of Cash: If you're considering a cash contribution to a charity, consider giving stock or other appreciated property instead. You can take a tax deduction for its value the day you give it away and avoid paying a tax on any gain. The charity gets the property to sell or hold for future sale. Worrying that a stock is too good to give up? Then buy more of the same stock to replace what you donated. Your basis will be today's price rather than what you originally paid. | Anyone itemizing | 18 | 3 | Tax Planning |
| Writing Off Health Insurance Costs: Because you're self-employed, you can reduce your taxable income by the cost of health insurance premiums for you and your family. If your spouse works for you, you can even deduct the premium costs from your business income and reduce the self-employment taxes you must pay. But you can't take this break if you can get health insurance through your employer (if you have a job as well as your own business) or your spouse's employer (unless that's you). | 1. Married filing jointly or married filing separately, Schedule C or F with net income 2. No SE health insurance deduction. TPS: SE health ins Y/N? must be required field 3. Suppress message if any single W-2 is greater than $18,000 | 1 | 4 | SE/Small Business |
| Start a Retirement Plan: Even though you don't have any employees, you can still set up a retirement savings plan for yourself and deduct your contributions from your taxable income. | Same as last year plus no entry on wages line of C or F | 4 | 4 | SE/Small Business |
| Home Office Expenses: You didn't claim any rent expenses this year for your business. If you run a business out of your home, you can write off some of your mortgage interest, utilities and other household costs against your business | Output triggers same as last year. Onscreen, exit rent/lease field (enter next field) | 3 | 4 | SE/Small Business |

TABLE 2-continued

| Statement | Trigger | Pri. | Cat. | Cat. Name |
|---|---|---|---|---|
| income. All that's required is that you use your home office exclusively and regularly in your business. | | | | |
| Additional First-Year Depreciation: As a business owner, you may be thinking about buying new assets for your business this year. Remember, most non-real estate assets placed in service during 2003 will qualify for an additional 30% first-year depreciation deduction. | Schedule C, F on return Cursor on asset pop-up Output: C or F gross receipts > $5,000. | 6 | 4 | SE/Small Business |
| Business Assets: For 2003, you can deduct up to $25,000 of the cost of business assets other than real property. For 2003, you can deduct up to $25,000 of the cost of business assets other than real property thereby reducing your taxes. | Schedule C, F on return; cursor on depreciation screen. Output: Schedule C, F with gross receipts > $25,000 | 7 | 4 | SE/Small Business |
| Retirement Advice: Do your employees have lots of questions related to their retirement-plan options? You can now deduct the cost of providing retirement advice to your employees without treating the value of the advice as income to them. | Entry on pension or employee benefits line of Schedule C or F | 10 | 4 | SE/Small Business |
| Medical Plan Costs: 2003 is a good year to consider getting health insurance through your business. That's because, as someone who is self-employed, you can now deduct up to 100% of the cost of your premiums, even if you don't itemize deductions. | 1. Filing Status = Single, HH, or QW, Schedule C, F with net income 2. No SE health insurance deduction. 3. Suppress message if any single W-2 is greater than $18,000 | 2 | 4 | SE/Small Business |
| Credit for Starting a Pension Plan: A pension plan is an important benefit to many employees. If you choose to set one up for your employees, you can take a credit for up to $500 of the cost of setting up an employer pension plan. | EIN and wages present, no pension benefits. Exit screen | 5 | 4 | SE/Small Business |
| Home Office Expenses: If you're using your home in running your business, you can allocate some of your home expenses (mortgage interest, utilities, etc.) to the business. | Schedule C with rent expense, mortgage interest, or property tax. Onscreen, exit rent/lease field (enter next field). | 9 | 4 | SE/Small Business |
| Professional Fees and Commissions: Sometimes you need professional business help. Be sure to keep track of any professional fees and commissions you pay because you'll need to give a Form 1099-MISC to each professional or contractor whom you pay more than $600 during 2003. You'll need to prepare the required statements, and mail them before Mar. 1, 2004. | Onscreen message as commissions/fees field entered. Output: Schedule C with gross receipts > $10,000. | 11 | 4 | SE/Small Business |
| Hiring Your Kid(s): Employing your kid(s) in your business can pay off. Wages you pay for reasonable work-like answering phones or cleaning the office-are treated as taxable income for your kid(s) and business expenses for you. Your kid(s) can offset any income they earn by a standard deduction amount-$4,700 for single people in 2003. So if your kid's only income is the $3,000 paid by you, your kid's tax bill is $0 and you have $3,000 less taxable income-and lower self-employment taxes. | Dependents born after Dec. 31, 1985 | 8 | 4 | SE/Small Business |
| Free Government Matching: Based on your 2002 tax return, it appears that you may be able to claim a Saver's Credit in 2003. To claim this credit, you will need to put money into an IRA or retirement plan, and the government matches up to 50% of the amount you contribute. | 1. AGI equal to or less than $50000 MFJ, $37500 HH or $25000 for S, MFS, and QW 2. Born before 1979 3. No input in planning portion of Saver's Credit calculator 4. Not both full time students, not both dependents of another 5. No dependents 24 or younger 6. Suppress if $0 tax liability and no presence of regular child tax credit 7. Suppress if no earned income | 1 | 5 | Government Assistance |
| Free Government Matching: You may be eligible for a Saver's Credit in 2003 if you're not a student, no one else claims you as a dependent, and you set aside money for retirement. The credit works as a government matching plan for up to 50% of amounts you put into an IRA or retirement plan. | 1. AGI equal to or less than $50000 married filing jointly, $37500 head of household or $25000 for single, married filing separately, and qualified widower. 2. Born between 1979 and 1984 (inclusive) 3. No input in planning portion of Saver's Credit calculator (Remove) 4. Entered Saver's Credit Calcuation screen AND | | 5 | |

TABLE 2-continued

| Statement | Trigger | Pri. | Cat. | Cat. Name |
|---|---|---|---|---|
| | 5. A dependent AND/OR full-time student<br>6. Must have earned income | | | |
| Getting Your Fair Share: The government uses tax dollars to fund programs that can assist you with free or discounted foods, prescription drugs, job placement, housing, health care, etc. To find out which programs you are eligible for go to www.firstgov.gov. Seniors should also visit www.benefitscheckup.com. | Trigger for anyone that gets the screener question (doesn't matter if they answer Yes or No) | 2 | 5 | Government Assistance |
| Kiddie Tax: Beginning next year, (Child's (Children's) Name) investment income will no longer have to be reported on your return. You should consider shifting ownership of taxable investments to (Name(s)) so that the income from those investments is taxed at (Name'(s)) lower tax rate. | Same as last year | 2 | 6 | Budget, Saving, & Investment |
| Tax Free Growth: You might want to consider investing in tax-free investment products, such as municipal bonds. Because the interest income isn't taxed, the rate of return is higher than it appears. For example, assuming you could earn 6% on a tax-free investment, it would be like effectively earning Y % based on your current tax rate. | Replace the marginal tax bracket trigger with interest income > $2,000 & No 7216 restriction; no tax-exempt interest reported. | 5 | 6 | Budget, Saving, & investment |
| Save Regularly: You don't need to build a big nest egg all at once. Most banks and financial institutions offer automatic savings programs, and many employers offer automatic payroll deductions to fund a savings account. These types of programs are an easy way to get started because they let you automatically save as little as $25 a month. | 1. Income > $20,000<br>2. No retirement plan indicator, No IRA<br>3. No Schedule D<br>4. Schedule B income $0-75.<br>5. W-2 income.<br>6. Check for systematic investment on a new Express IRA. | 1 | 6 | Budget, Saving, & Investment |
| Dividend Reinvestment Plans: If you used your stock dividends to buy more stock, be sure to save this tax return until you sell those shares to ensure you report your cost in the stock correctly. | Any dividend income | 4 | 6 | Budget, Saving, & Investment |
| Capital Loss Carryover: We used $3,000 of your net capital loss to offset income on your 2002 return. The remaining $Y of this loss will be carried forward to offset future income. You should take this into consideration as you plan your investment strategy for 2003 and beyond. | More than $3,000 net loss TPS: Net Schedule D loss = X; Y = X-3000 | 3 | 6 | Budget, Saving, & Investment |
| Identify Your Stock: If you bought stock or mutual fund shares at different times and prices, let your broker know which shares you're selling. The IRS will assume you sold the shares you owned longest, but you can minimize a loss or maximize a gain by designating the specific shares you want to sell in the orders you give your broker (get a written confirmation!). For example, your instructions might say: "Sell the shares I bought on Jun. 23, 1995" or "Sell the shares I bought for $12.50." | Schedule D | 6 | 6 | Budget, Saving, & Investment |
| Borrowing to Invest: If you borrow money to make investments, the interest on that loan is usually deductible--but there are catches. The loan has to be for an investment aimed at making taxable income, so borrowing to buy tax-free municipal bonds won't get you a deduction. Your interest write-off is limited to the amount of your taxable investment profit, but you can carry over the unused interest deduction until next year. There are some additional restrictions. | Schedule D, total income > $75K | 7 | 6 | Budget, Saving, & Investment |
| Catch-Up IRA Contributions: Because you are X (and/or your spouse is X), you're eligible to make catch-up contributions to your IRA or Roth IRA. You can contribute an additional $500 on top of the $3,000 maximum allowed for the year. | 1. Age > 50, but < 69<br>2. IRA contribution<br>3. No 7216 restriction<br>4. Earned income is greater than $3,500.<br>5. Suppress if no W-2 income.<br>TPS: Recalculate new tax liability based on current taxable income - $500. X = age. | 2 | 7 | Retirement |
| Catch-Up Retirement Plan Contributions: Because you are X (and/or your spouse is X), you may be eligible to make catch-up | Age 50+, W-2 income, box 12 coded D, E, F, G, H. TPS X = Age Onscreen message should only appear on the first eligible W-2. | 1 | 7 | Retirement |

TABLE 2-continued

| Statement | Trigger | Pri. | Cat. | Cat. Name |
|---|---|---|---|---|
| contributions of up to $1,000 to your employer-sponsored retirement plan. Check with your employer to see whether your plan allows such catch-up contributions. | | | | |
| Sign up for Your Employer's Retirement Plan: You told us you're eligible for a retirement plan at work, but you currently don't contribute to it. Consider signing up during the next enrollment period to take advantage of the tax savings. | 1. Retirement Plan - offered by employer 2. No Saver's Credit Calculator completed (aka 2003 section at top of calculator) 3. Suppress if no W-2 income. | 3 | 7 | Retirement |
| Find Out If Your Employer Offers a Retirement Plan: Retirement plans offer a great way to put tax-free money away for your retirement. Contact the benefits department at work to find out if you are eligible and how to enroll. | 1. Retirement Plan - offered by employer 2. No Saver's Credit Calculator completed (aka 2003 section at top of calculator) 3. Suppress if no W-2 income. | 4 | 7 | Retirement |
| IRA: Even though you're not eligible for a retirement plan at work, you can still put money away for your retirement in an Individual Retirement Account (IRA). You should consider setting up an IRA to take advantage of tax-free growth. | 1. Retirement Plan - not offered by employer 2. No Saver's Credit Calculator completed (aka 2003 section at top of calculator) 3. Suppress IRA message if contributions are present 4. Suppress if no W-2 income. 5. Suppress if XIRA is present | 5 | 7 | Retirement |
| Maximize Your Retirement Savings: You are not currently making maximum allowable contributions to your retirement plan. Consider increasing contributions to your retirement plan to get the maximum available tax advantages. Contact your benefits department at work to find out how to change your contribution level. Also, be sure to ask if you are eligible for any matching contributions. | 1. No - Maximizing current retirement plan at work 2. No completed Saver's Credit calculator (aka 2003 section at top of calculator) 3. Suppress if no W-2 income. | 6 | 7 | Retirement |
| Maximize Your Retirement Plan: Contact your benefits department to find out the maximum amount you can contribute to your plan, and how to change your contribution amounts if necessary. Also, be sure to ask if you are eligible for any matching contributions. | 1. Don't know - Maximizing current retirement plan at work 2. No completed Saver's Credit calculator (aka 2003 section at top of calculator) 3. Suppress if no W-2 income. | 7 | 7 | Retirement |
| Consider a Nondeductible IRA: Even though you are maximizing your retirement plan at work, you may still want to put away more to achieve your desired standard of living when you retire. If so, consider investing in a nondeductible IRA (contributions won't be deductible because of your income, but the value of your IRA will still grow tax-free until you make withdrawals). | 1. Income > $160,000/150,000 married filing jointly; $10,000/0 married filing separately; $110,000/95,000 all other statuses (optional) 2. No IRA contributions 3. Maxing retirement plan? answer Y. 4. Suppress if Saver's credit message (Diag 815] generates 5. Suppress if no W-2 income. 6. Must have earned income. 7. Suppress if XIRA is present | 8 | 7 | Retirement |
| Roth IRA Contributions: Consider opening a Roth IRA. You can contribute up to $3,000 each year. Unlike a traditional IRA, contributions aren't deductible, but you can withdraw your contributions at any time without paying taxes or penalties (although the earnings will be taxed). And after five years, you can withdraw your earnings -- free from taxes and penalties -- if you use the money to buy a first home or you're over 59½. | 1. Income not more than $150,000 married filing jointly, $0 married filing separately, $95,000 all other statuses 2. No IRA contribution. (Suppress if Saver's credit msg [Diag 815] generates.) 3. Must have earned income 4. Suppress if no W-2 income 5. Suppress if XIRA is present | 9 | 7 | Retirement |
| Make Your IRA Contributions Sooner: Don't wait until the last minute to make your 2003 IRA contributions. The earlier in the year you put money into your IRA, the longer you give your tax-deferred savings to grow. | 1. Entry in Field: Traditional IRA - any contribution made after Dec. 31, 2002 2. Suppress if no W-2 income. | 10 | 7 | Retirement |
| Refinancing: Based on the information you provided us, it appears you may not have taken advantage of historically low interest rates. We recommend you review your mortgage terms. You may be able to lower your current interest rate to reduce your monthly payments and the total amount of interest you would pay over the life of your mortgage loan. | No 7216 restriction calculated when calculator is populated. Trigger for this new statement: Have refinanced since January 2002 - No and/or > 7% interest rate. | 4 | 8 | Home Ownership |
| Debt Consolidation: As a homeowner, you can reduce your monthly debt payments and total interest costs while lowering your taxes. Consider consolidating your non-deductible | No 7216 restriction credit card | 3 | 8 | Home Ownership |

TABLE 2-continued

| Statement | Trigger | Pri. | Cat. | Cat. Name |
|---|---|---|---|---|
| debt (e.g., credit card, car loan, etc) with a home equity loan, which is usually tax deductible. Check with your lending institution to see if you qualify for a home equity loan. | | | | |
| Saving for a Down Payment: If you would like to buy a home but find it difficult to save the down payment, consider using a Roth IRA. After five years, you can withdraw all of your contributions and use up to $10,000 of earnings free of taxes or penalties if the money is used to buy a first home. | 1. W-2 < Roth limit<br>2. AGI > $20,000<br>3. No Roth info indicated on return<br>4. Suppress if no W-2 income. | 6 | 8 | Home Ownership |
| Reevaluate your PMI: Private Mortgage Insurance (PMI) is typically required by lenders when you pay less than 20% down on your home. PMI provides no ongoing benefit to you and adds to your monthly mortgage costs. You can usually stop paying it once the equity in your home reaches 20%. Ask your lender whether you qualify to stop paying PMI. | Yes or don't know paying PMI | 1 | 8 | Home Ownership |
| A Gift from the IRS: If you're selling your home, the IRS has a gift for you. Any gain on that sale up to $500,000 for a married couple and $250,000 for a single person may be tax-free as long as you've lived in the home for two of the past five years. If you've taken a home office deduction or rented out part of the home, however, your profit for that portion of the home is taxable as a capital gain and depreciation deductions you've taken since 1997 will be taxed at up to 25%. | Yes to selling primary residence & Yes to have lived & owned 2 of last 5 years | 5 | 8 | Home Ownership |
| Estate Strategy: You should have your gift and estate strategy reviewed by your lawyer in light of recent and expected tax law changes. For example, you can now give up to $11,000 a year to any person without paying gift tax. Any time you exceed the annual recipient limit, you will need to file a gift tax return, but you won't actually pay gift taxes unless you give more than one million dollars over your lifetime. | Will question answered yes AND income > $45K or pension income > $20K or interest/dividend income > $2,000 | 1 | 9 | Estate Planning |
| Protect Your Kid(s): A will can help ensure that your wishes about the care of your kid(s) and how your assets should be divided are followed after your death. Without a will, (state of residence) will decide for you. Lawyers can prepare a will or you can draft your own. If you do it yourself, we recommend having a lawyer review it. | | 3 | 9 | Estate Planning |
| Consider Getting a Will: Wills are important to ensure your friends and family are not left with unnecessary decisions about how to carry out your wishes. A lawyer can help you prepare a will or you can draft your own. If you do it yourself, we recommend having a lawyer review it. | Income > $45,000 OR pension > $20,000 OR interest income > $2,000. Answer will question No. AND No Dependents | | 9 | Estate Planning |
| Borrowing to Invest: If you borrow money to make investments, the interest on that loan is usually deductible--but there are catches. The loan has to be for an investment aimed at making taxable income, so borrowing to buy tax-free municipal bonds won't get you a deduction. Your interest write-off is limited to the amount of your taxable investment profit, but you can carry over the unused interest deduction until next year. There are some additional restrictions. | Dependents 0-18, AGI > $50,000 | 3 | 10 | Education |
| Saving for Education: Education Savings Accounts (ESAs) allow you to save for elementary, secondary, or post-secondary education expenses. Section 529 plans, on the other hand, can only be used to pay higher educadon costs. But they can offer immediate state tax savings. Both plans allow tax-free withdrawals for qualified education expenses and can be started for as little as $25 a month. | Dependents 0-18, AGI $20,000-$50,000 | 2 | 10 | Educatlon |

TABLE 2-continued

| Statement | Trigger | Pri. | Cat. | Cat. Name |
|---|---|---|---|---|
| Consolidating Student Loans: Recent reductions in student loan interest rates make it a great time to consider consolidating your student loans. Contact your lender for more information - and be sure to ask about discounts for automatic payments and on-time payments. | Yes response to Did you or your spouse make any payments on student loans (for self or dependent)? (multiple 1098-Es? ) | 1 | 10 | Education |
| Deducting Student Loan Interest: If you plan to take out loans to pay for your children's education costs, remember that up to $2,500 of student loan interest can be used to reduce taxable income. Because this is an adjustment to income, any taxpayer--not just someone who itemizes, can take it. | Dependents born between Jan. 1, 1980 and Dec. 31, 1987 | 4 | 10 | Education |
| Increased Standard Deduction: You will qualify for an increased standard deduction next year, which will save you about $X in taxes if your taxable income stays the same next year. | "X" > 0 | 9 | 11 | Safety Net |
| Life Changes Impact Your Taxes: Getting married or divorced, getting a promotion, having a baby, buying a home or becoming self-employed are just a few life events that can affect your taxes. If your life situation changes-- or if you would like to manage the size of your refund next year--adjust your withholding by filling out a new Form W-4 to give to your employer. | Refund $1000 or less No 824 Diag | 1 | 11 | Safety Net |
| Education Savings Accounts (ESAs): You can make nondeductible contributions to these accounts for the benefit of a niece, nephew, godchild, grandchild -- in fact, any child -- for as little as $25 a month. And withdrawals are tax-free if the money is used to pay for the child's education -- even for elementary or secondary education and supplies, computer, or Internet costs. For more information go to www.savingforcollege.com. | Taxpayer age 45+ and (AGI > $45,000 or interest/dividend income > $500 or pension. income > $20,000) no other education message | 11 | 11 | Safety Net |
| Getting Your Refund All Year: Congratulations! You're getting a big refund. You're pleased because you can use the money. Uncle Sam is pleased, too, because you've loaned him all that money interest-free for 12 months. If you'd rather get more in each paycheck, adjust your withholding so that you get a smaller refund at tax time but more money every payday. Fill out a new Form W4 to give to your employer. | Refund > $1000 No 824 Diag | 2 | 11 | Safety Net |
| Dependents Come in Lots of Sizes: Remember that a dependent doesn't have to be a child or even a relative. You can claim anyone who lives in your home, has less than $3,000 in taxable income and receives at least 50% of his or her support from you. If a dependent is related to you (by blood, marriage or adoption), he or she doesn't even have to live with you. If you're not sure, we'll help you figure out if a particular individual qualifies as your dependent. | Age > 18 | 12 | 11 | Safety Net |
| Roth IRA Withdrawals: You can withdraw your Roth IRA contributions at any time without paying tax or penalties. After five years, you can also withdraw your earnings -- free from taxes and penalties -- if you use the money to buy a first home or you're over 59 ½. | Enter Roth IRA Actual Contributions field | 13 | 11 | Safety Net |
| Emergency Cash Reserves: You should have at least 90 days' worth of net income set aside to pay for unexpected expenses. If you save $X each month, at the end of two years you will have saved your 90 days' worth, $Y. | 1. Gross income > $30,000 MFJ; $25,000 other statuses. 2. No message if interest income >= $250. 3. "X" > 0 TPS: Y = [(1040 line 39 − line 58)/4]. X = Y /24. | 6 | 11 | Safety Net |
| Keep Track of Your Charitable Contributions: Even though you didn't itemize your deductions this year--and might not next year--it could pay to keep track of your cash and non-cash contributions to charity. That's because Congress is considering a new tax rule that will let every taxpayer take a tax deduction for charitable donations--even if you don't | 1. Anyone who takes the standard deduction 2. Suppress if $0 tax liability and no presence of regular child tax credit | 3 | 11 | Safety Net |

TABLE 2-continued

| Statement | Trigger | Pri. | Cat. | Cat. Name |
|---|---|---|---|---|
| itemize your deductions. If that does become law, you'll be glad you kept track of what you gave to charity. | | | | |
| What If Your Stock Splits: If a company whose stock you own declares a stock split, your basis in that stock for tax purposes remains the same even though you now own more shares. Say you bought 100 shares of company XYZ for $10 and paid a $50 commission. Your basis is $1,050--the purchase price plus the commission--or $10.50 a share. Company XYZ declares a 2-for-1 stock split and you now own 200 shares. Your basis remains $1,050. Divide by 200, and you have a basis of $5.25 a share. | Schedule D | 4 | 11 | Safety Net |
| Remember the Wash Sale Rule: Forget about selling a stock to show a loss if you quickly buy replacement shares of the same stock. Under the "wash sale" rule, you can't claim a loss on a stock sale if you buy the same stock within 30 days before or after the sale. In fact, you don't get the benefit of the loss until you sell the replacement stock. The same rule doesn't apply to gains, so you can't wash out a capital gain by buying the same stock back within 30 days. | Schedule D | 5 | 11 | Safety Net |
| Start Saving Now: The sooner you start saving, the more time you'll have for your nest egg to grow. If you set aside just $50 each month at an interest rate of 4%, you would have nearly $3,400 after five years. Keep doing this for 25 years, and you'll have nearly $26,000. Put the same money aside in a tax-deferred account such as an IRA, and you'll get have even more bang for your bucks. | 1. Age < 40 years old (Reasoning is 25 years from now = 65)<br>2. Suppress if no W-2 income<br>3. Suppress if XIRA is present | 7 | 11 | Safety Net |
| Borrowing from Your 401(k): If your employer permits it, you can borrow up to 50% of the value of your 401(k) account tax-free if you repay the loan within 5 years. You can take longer to repay the loan if you use it to buy a principal residence. Employers who permit this--and it's up to the employer--will usually set up a payroll withdrawal plan to repay the loan. But beware: if you leave that employer before you pay the loan off, the IRS will tax and penalize the outstanding balance. | Anyone with a 401(k) at work | 8 | 11 | Safety Net |
| Beware the Credit Card Trap: Paying the "minimum due" on your credit card each month costs more than you think. If you have a $1,000 balance with a credit card that charges 18%, it will take over 7.5 years to payoff . . . and cost over $800 in interest. Pay just $30 more than the minimum each month and it will only take four years and $310 in interest. If you need help, non-profit credit counseling services can negotiate lower rates or other concessions. | No trigger - this should appear for anyone that is that far down in the cascading advice protocol. | 10 | 11 | Safety Net |
| When More Than One Person Is Providing Support: There's an exception to the rule that you have to provide more than half of someone's support to claim him or her as a dependent. A brother and sister, for example, might be providing significant support for an elderly parent but separately fail the 50% support rule. In that case, one of them could claim the parent as a dependent if the other signs a Form 2120--Multiple Support Declaration. We can help you with this. | Taxpayer or spouse age > 30 Income > $25,000 | 14 | 11 | Safety Net |
| If You Inherit: If you inherit money or property from someone's estate, your inheritance is generally free of taxes. However, you may be taxed on funds you inherit from a traditional IRA or a 401(k). If you inherit a home and sell it, only the difference between the value when you inherited it and when you sold it is taxable. Any gain before you inherited it is not taxed. We can | No trigger - this should appear for anyone that is that far down in the cascading advice protocol. | 15 | 11 | Safety Net |

TABLE 2-continued

| Statement | Trigger | Pri. | Cat. | Cat. Name |
|---|---|---|---|---|
| help determine which part of your inheritance, if any, is subject to federal or state taxes. | | | | |
| Add disclaimer to top of template: This report has been customized for you based on your 2002 tax return. The statements below are designed to help guide your thinking about your unique tax and financial situation, but are not a substitute for legal, accounting, tax, or other professional advice. | | N/A | N/A | |
| Add new template for deceased statements. Allows introductory paragraph: Many changes come with the loss of a loved one. Because finances may not have been at the forefront of your mind this year, please take a moment to review the following checklist of things to consider. Remember, we are here year-round to help you adjust to any changes in your tax and financial situation. | 1. Filing status is married filing jointly 2. Taxpayer or spouse is deceased | N/A | 13 | Deceased |
| Appraise Your Property: When you choose to sell property, you pay tax on the gain in value. When you inherit property including jointly owned property, the basis (the amount you paid for it) can usually be adjusted to the fair market value on the date of death. This means that if the property has appreciated, a professional appraisal now can save tax dollars later. Different rules apply to your primary residence. | 1. Filing status is married filing jointly 2. Taxpayer or spouse is deceased | N/A | 13 | Deceased |
| Verify Property Ownership: It's important to accurately document the legal ownership of property. Review the name in which all of your property is titled. Also verify that the name(s) and social security number(s) on all of your accounts are accurate and up to date. | 1. Filing status is married filing jointly 2. Taxpayer or spouse is deceased | N/A | 13 | Deceased |
| Review Beneficiary Information: The beneficiary information for your IRAs, savings, insurance policies, and other accounts may be out of date. Review your accounts and contact the financial institutions where the accounts are held to update this information. | 1. Filing status is married filing joindy 2. Taxpayer or spouse is deceased | N/A | 13 | Deceased |
| Manage Lump Sum Payments: If you have received a lump sum of money from an insurance policy or some other source, you may want to speak with a professional financial advisor about the best way to manage those dollars based on your personal and financial circumstances. A professional financial advisor will be able to work with you to help you determine your objectives. | 1. Filing status is married filing jointly 2. Taxpayer or spouse is deceased | N/A | 13 | Deceased |
| Tax Planning: You may have changes in both your tax situation and your monthly income. Your tax professional can help you plan for these adjustments by reviewing your withholding and estimated payments and helping you make any necessary modifications | 1. Filing status is married filing jointly 2. Taxpayer or spouse is deceased | N/A | 13 | Deceased |

Triggers and priorities as well as associated calculations may be established for as many statements as may be needed to cover topics and issues that are likely to be of interest to taxpayers. For example, taxpayers may receive tax advice documents comprising statements related to income, deductions (e.g., charitable contributions, student loan interest, moving expenses), tax credits (e.g., earned income credits, child tax credits, dependent care credits, Hope Scholarship Credit/Lifetime Learning Credit), employer sponsored or self-employment qualified retirement plans (e.g., 401(k), 403 (b), 457, SEP, SIMPLE, Keogh plans), flexible spending accounts, IRA contributions, tax-exempt investments, and social security tax payments.

An example tax advice document format according to an example embodiment of the present invention is shown in Table 3. The name of the document recipient is entered in the fields of the "prepared for:" line of the first row. Information regarding the document preparation date and preparer is also provided. Next, a "Today's Savings" area of the document includes taxpayer specific data related to the tax return data for the taxpayer. The "Filing, Refund and Balance Due Information" area includes information regarding any tax refunds that are due to the taxpayer or tax payments that the taxpayer is required to make. Finally, the "Looking Ahead Opportunities and Advice" area contains tax advice recommendations and statements that are selected according to associated triggers, calculations, and priorities. The recommendations and statements that are selected for the taxpayer identify specific actions that the taxpayer may take. By following the tax advice recommendations and statements, the taxpayer may be able to reduce his or her tax liability in subsequent tax years or obtain other financial benefits.

TABLE 3 prepared for: <FirstName> <MI>. <LastName> <Suffix>

| | |
|---|---|
| Date prepared: Oct. 22, 2003 | Prepared by:<br>Ima Tax Pro<br>1111 Main St.<br>Anytown, Missouri 11111<br>(800) 555-1111 |

Today's Savings

Taking advantage of the new Saver's Credit this year saved you $187 in taxes.
By participating in a qualified retirement plan through your employer, we calculated that you saved $45 in taxes this year because you funded the plan with pretax dollars.
By ensuring that you qualified for a $1,300 earned income credit this year, we helped you obtain a $4,062 refund. Talk with your tax professional about receiving your benefits throughout the year with advance earned income refund.
Claiming the child tax credit for this year helped you reduce your federal taxes by $600.
Claiming the dependent care credit for you this year helped you reduce you federal taxes by $506.
We compared your options, including two credits, two deductions, and several types of tax-free payments, and we were able to reduce your taxes by $105. Be sure to keep track of all of your expenses, including student loan interest, for 2004.
In simple terms, the Marginal Tax Rate is the highest percentage of tax that you pay on any dollar of taxable income. As income rises, the tax rates get higher. The Effective Tax Rate is the percentage of your total income that you paid in taxes. For 2003, your Marginal Tax Rate is XX % and your Effective Tax Rate is YY %.
In addition to the $X savings identified above, we helped you save $Z. So overall, we were able to help obtain a net tax savings of $Y on your tax return.

Filing, Refund and Balance Due Information

| Tax Return | E-File/Mail to | Refund/<br>(Balance Due) | Summary | |
|---|---|---|---|---|
| Federal | Your federal return has been e-filed. | $4,062.00 | Refund/Balance Due<br>Express IRA<br>Preparation Fees<br>Bank Fees | $4,062.00<br>($426.00)<br>($45.00)<br>($197.00) |

Delivery: Your IRS Check for the estimated amount of $4,062.00 will be available in about 8-15 days.
Your tax professional can tell you how to check the status of your refund.

| | | | | |
|---|---|---|---|---|
| Missouri | Please mail your check and return to:<br>Missouri Department of Revenue<br>P.O. Box 3222<br>Jefferson City, MO 65105-3222 | | | ($20.00) |

Delivery: Your check payable to Missouri Department of Revenue for the estimated amount of $20.00 is due by Apr. 15, 2004.

Looking Ahead Opportunities and Advice

Getting Money Quickly
A Refund Anticipation Loan (RAL) is certainly one of the fastest ways to get the amount of your anticipated refund. But as you know, the lending bank charges you for this service. And you must repay the loan in full even if the IRS doesn't approve your refund. Remember, you can get your refund in approximately 10-21 days and avoid the bank fee just by filing electronically and requesting direct deposit. That way, you can put more of your refund in your pocket.
Insure Your Kid(s):
Your kid(s) may be eligible for low-cost or free health care in Missouri--even if you work full time. To find out more, call 1(877) KIDS NOW, (543-7669) toll free or visit www.insurekidsnow.gov on the Internet. Ask your tax professional for a brochure about this program.
Saver's Credit:
We calculate that you can take advantage of the Saver's Credit in 2004. If you contribute $1,000 to a qualified plan, your savings in 2004 can be as much as $759. Your best savings strategy depends on your specific situation. Your tax professional can help you compare the benefits of the retirement savings options available to address your short-term and long-term savings goals.
Getting Your Fair Share:
The government uses tax dollars to fund programs that can assist you with free or discounted foods, prescription drugs, job placement, housing, health care, etc. To find out which programs you are eligible for go to www.firstgov.gov. Seniors should also visit www.benefitscheckup.com.
Plan to Buy a Home:
Home ownership may seem an impossible dream - but it's never too early to starting planning. Owning a home has many advantages: protection from inflation, tax breaks, equity build-up, and maybe even special opportunities for the first-time buyer. Check with your tax professional for more information. That dream may be closer than you think.

TABLE 3-continued

Protect Your Loved Ones:
A will can help ensure that your wishes about the care of your kid and how your assets should be divided are followed after your death. Without a will, Missouri will decide for you. Lawyers can prepare a will or you can draft your own. If you do it yourself, we recommend having a lawyer review it.
Saving for Education:
Education Savings Accounts (ESAs) allow you to save for elementary, secondary, or post-secondary education expenses. Section 529 plans, on the other hand, can only be used to pay higher education costs. But they can offer immediate state tax savings. Both plans allow tax-free withdrawals for qualified education expenses and can be started for as little as $25 a month. Ask your tax professional for more information.
Getting Your Refund All Year:
Congratulations! You're getting a big refund. You're pleased because you can use the money. Uncle Sam is pleased, too, because you've loaned him all that money interest-free for 12 months. If you'd rather get more in each paycheck, adjust your withholding so that you get a smaller refund at tax time but more money every payday. We can help you fill out a Form W4 and advise you on how to submit it.

An Ima Tax Pro service representative is available year-round to provide you with information about these opportunities. For more information about tax, mortgage, and financial services call 1-800-IMATAXP or visit imataxpro.com. This Ima Tax Pro Advantage document presents suggestions that may help you improve your tax and financial situation. Its contents should be considered in conjunction with other information you receive from qualified sources that are familiar with your specific circumstances.

The statements are then viewable and printable as part of the tax return preparation and printing process. The number and types of triggered and/or printed recommendations or statements are then captured by the tax preparation software for national analysis. Triggers, categories, and priorities may be adjusted as desired for greater specificity or generality, to emphasize a particular category or subject.

Figure 2:
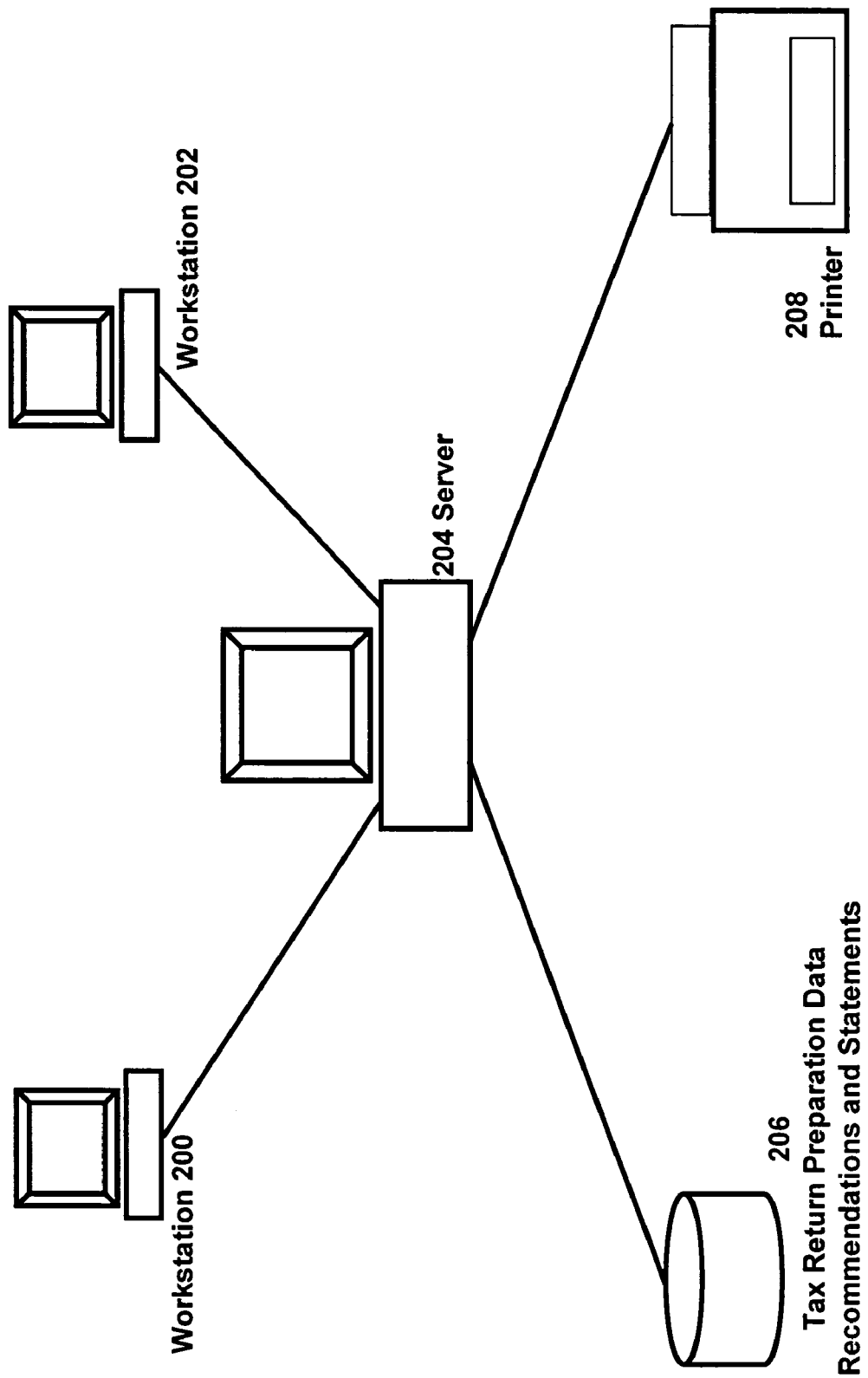
FIG. 2 is a diagram of the primary hardware components according to an example embodiment of the present invention.

Referring to FIG. 2, a diagram of the primary hardware components in a first configuration according to an example embodiment of the present invention is shown. In an example embodiment of the present invention, tax return preparation software stored at a server computer 204 is accessible from a plurality of workstations 200, 202. The tax preparation software operates in conjunction with tax return preparation data 206 accessible from the server 204. The tax advice recommendations and statements used to generate personalized tax advice documents for taxpayers 206 may also be accessible from the server 204. Finally, a printer 208 connected to the server 204 may be used to print personalized tax advice documents generated using the tax return preparation software.

In a second configuration for an example embodiment of the present invention, the tax return preparation software may be stored at and operable from a standalone computer. The tax advice recommendations and statements may also be stored locally so that a personalized tax advice document according to the present invention may be generated at the standalone computer and printed from a printer attached to the standalone computer. Finally, in a third configuration, the tax return preparation software may be stored at and operable from a web site. Tax preparers may connect to the web site to operate the tax preparation software and obtain personalized tax advice documents. The tax advice documents may then be printed at a local printer.

The present invention creates a much more personalized and more relevant grouping of financial advice recommendations and statements that are presented in order of urgency, specificity, and applicability for each taxpayer's unique situation. It generates from taxpayer data entered into a tax preparation program a personalized, prioritized set of applicable advice recommendations or statements from a highly specific data source such as a federal income tax return. The taxpayer may obtain a printed tax advice document comprising specific recommendations and statements that allow the taxpayer to take specific actions that may result in tax savings or other financial benefits in later tax years.

While example embodiments of the invention have been illustrated and described, various modifications and combinations can be made without departing from the spirit and scope of the invention. For example, the categories of statements and the content of statements may be modified and prioritization of the categories or statements may be adjusted and still fall within the scope of the present invention. Modifications, combinations, and equivalents to the system and method of the present invention are intended to be covered and claimed.

What is claimed is:

1. A computerized method for generating a tax advice document from a tax return preparation program executing on a computer comprising:
 (a) entering in said computer a plurality of tax advice statements relevant to a tax liability;
 (b) entering in said computer assignments of at least two of said tax advice statements to a client-requested category;
 (c) entering in said computer assignments of each of said plurality of tax advice statements except said at least two of said client-requested category tax advice statements to one of a plurality of other tax advice categories;
 (d) entering in said computer assignments of a category relevance value to each of said tax advice categories of tax advice statements;
 (e) entering in said computer assignments of a statement relevance value to each of said tax advice statements in each of said tax advice categories;
 (f) associating in said computer each of said plurality of tax advice statements with a trigger in said tax return preparation system;
 (g) entering in said computer a category maximum number of tax advice statements from each of said tax advice categories to include on a tax advice document;
 (h) entering in said computer a total maximum number of tax advice statements to include on a tax advice document;
 (i) entering in said computer at least two interview questions for determining which of said tax advice statements in said client-requested category to include first in a tax advice document;

(j) entering taxpayer data into said tax preparation program executing on said computer, said taxpayer data including a taxpayer's response to an interview question for selecting a tax advice statement from said client-requested category to include in a tax advice document that also comprises;
  (1) tax advice statements selected from said plurality of tax advice statements when conditions associated with said triggers in said tax return preparation program executing on said computer are met;
  (2) selected tax advice statements from said client-requested category up to said category maximum number of tax advice statements for said client-requested category;
  (3) selected tax advice statements from said other tax advice categories up to said category maximum number of tax advice statements for each of said other tax advice categories;
  (4) a number of said selected tax advice statements from said client-requested category and said selected tax advice statements from said other tax advice categories that does not exceed said total maximum number of tax advice statements;
  (5) a first selected tax advice statement from said client-requested category; and
  (6) selected tax advice statements from said other tax advice categories ordered on said tax advice document according to said category relevance value and within each category said statement relevance value.

2. The computerized method of claim 1 further comprising:
(k) printing said tax advice document for said taxpayer.

3. The computerized method of claim 1 wherein said tax advice statements are selected from the group consisting of statements related to income, deductions, tax credits, qualified retirement, flexible spending accounts, IRA contributions, tax-exempt investments, and social security tax payments.

4. The computerized method of claim 1 wherein said other tax advice categories for said plurality of tax advice statements are selected from the group consisting of: tax alerts, tax planning, self-employed/small business, government assistance, saving and investments, retirement, home ownership, estate planning, education, and safety net.

5. The computerized method of claim 1 wherein at least one tax advice statement in said tax advice document comprises a value calculated according to said tax return data for said taxpayer.

6. A computerized method for generating a tax advice document from a tax return preparation program executing on a computer comprising:
  (a) entering in said computer a plurality of tax advice statements;
  (b) entering in said computer an assignment of at least two of said tax advice statements to a client-requested category;
  (c) entering in said computer an assignment of each of said plurality of tax advice statements except said at least two of said client-requested tax advice statements to one of a plurality of other categories;
  (d) entering in said computer an assignment of a category relevance value to each of said tax advice categories wherein said client-requested category is assigned a highest category relevance value;
  (e) entering in said computer an assignment of a statement relevance value to each of said plurality of tax advice statements in each of said tax advice categories;
  (f) entering in said computer an assignment of a trigger within said tax return preparation program to each of said plurality of tax advice statements;
  (g) specifying in said computer a category maximum number of tax advice statements from each of said tax advice categories to include on a tax advice document;
  (h) specifying in said computer a total number of tax advice statements to include on tax advice document;
  (i) determining at said computer whether one or more of said at least two of said client-requested tax advice statements are triggered after responses to interview questions are entered in said tax return preparation program;
  (j) determining at said computer which tax advice statements in said tax return preparation program are triggered when tax data for said taxpayer is entered in said tax return preparation system; and
  (k) generating at said computer for said taxpayer a tax advice document comprising a subset of triggered tax advice statements said tax advice document comprising:
    (1) triggered tax advice statements from said client-requested category up to said category maximum number of tax advice statements for said client-requested category;
    (2) triggered tax advice statements from said other tax advice categories up to said category maximum number of tax advice statements for each of said other tax advice categories;
    (3) a total number of said triggered tax advice statements from said client-requested category and said triggered tax advice statements from said other tax advice categories not exceeding said total number of tax advice statements;
    (4) a first triggered tax advice statement from said client-requested category; and
    (5) tax advice statements from said other tax advice categories ordered on said tax advice document according to said category relevance value and within each category, said statement relevance value.

7. The computerized method of claim 6 further comprising:
(l) printing said tax advice document for said taxpayer.

8. The computerized method of claim 6 wherein said subset of tax advice statements is selected from the group consisting of statements related to income, deductions, tax credits, qualified retirement, flexible spending accounts, IRA contributions, tax-exempt investments, and social security tax payments.

9. The computerized method of claim 6 wherein said plurality of categories is selected from the group consisting of tax alerts, tax planning, self-employed/small business, government assistance, saving and investments, retirement, home ownership, estate planning, education, and safety net.

10. The computerized method of claim 6 wherein at least one tax advice statement in said subset of tax advice statements comprises a value calculated according to said tax return data for said taxpayer.

11. A computerized method for generating a personalized tax advice document from a tax return preparation program executing on a computer comprising:
  (a) entering in said computer a plurality of tax advice statements relevant to a tax liability;
  (b) entering in said computer an assignment of each of said plurality of tax advice statements to at least one of a plurality of tax advice categories;
  (c) entering in said computer an assignment of a category relevance value to each of said tax advice categories of tax advice statements;

(d) entering in said computer an assignment of a statement relevance value to each of said tax advice statements in each of said tax advice categories;
(e) entering in said computer an association of each of said plurality of tax advice statements with a trigger in said tax return preparation program;
(f) entering in said tax return preparation program data for a taxpayer;
(g) determining at said computer which tax advice statements from said plurality of tax advice statements are triggered when conditions associated with said triggers in said tax return preparation program are met;
(h) determining at said computer which of said triggered tax advice statements correspond to a client requested category based on said taxpayer's responses to interview questions in said tax return preparation program;
(i) specifying in said computer a category maximum number of tax advice statements to include a tax advice document for each of said categories;
(j) specifying in said computer a total number of statements to include on a tax advice document; and
(k) generating for said taxpayer a tax advice document comprising:
 (1) triggered tax advice statements from said client-requested category up to said category maximum number of tax advice statements for said client-requested category;
 (2) triggered tax advice statements from other categories up to said category maximum number of tax advice statements for each of said other categories;
 (3) a total number of said triggered tax advice statements from said client-requested category and said triggered tax advice statements from said other categories not exceeding said total number of tax advice statements; and
 (4) tax advice statements from said other categories ordered on said tax advice document according to said category relevance value and within each category, said statement relevance value.

12. The computerized method of claim 11 further comprising:
 (l) printing said tax advice document for said taxpayer.

13. The computerized method of claim 11 wherein tax advice statements are selected from the group consisting of statements related to: income, deductions, tax credits, qualified retirement, flexible spending accounts, IRA contributions, tax-exempt investments, and social security tax payments.

14. The computerized method of claim 11 wherein tax advice categories for said plurality of tax advice statements are selected from the group consisting of: tax alerts, tax planning, self-employed/small business, government assistance, saving and investments, retirement, home ownership, estate planning, education, and safety net.

15. The computerized method of claim 11 wherein at least one tax advice statement in said tax advice document comprises a value calculated according to said tax return data for said taxpayer.

* * * * *